(12) United States Patent
Schulaks (10) Patent No.: US 10,969,149 B2
(45) Date of Patent: Apr. 6, 2021

(54) REFRIGERANT COMPRESSOR SYSTEM

(71) Applicant: BITZER Kuehlmaschinenbau GmbH, Sindelfingen (DE)

(72) Inventor: Andreas Schulaks, Rottenburg (DE)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 164 days.

(21) Appl. No.: 15/702,841

(22) Filed: Sep. 13, 2017

(65) Prior Publication Data

US 2018/0003422 A1    Jan. 4, 2018

Related U.S. Application Data

(63) Continuation of application No. PCT/EP2016/054907, filed on Mar. 8, 2016.

(30) Foreign Application Priority Data

Mar. 13, 2015   (DE) ..................... 10 2015 103 730.0

(51) Int. Cl.
*F25B 49/02*    (2006.01)
*G05B 15/02*    (2006.01)
(Continued)

(52) U.S. Cl.
CPC ............ *F25B 49/022* (2013.01); *F04B 27/24* (2013.01); *F04B 39/121* (2013.01);
(Continued)

(58) Field of Classification Search
CPC .......... F25B 49/002; F25B 2700/21151; F25B 2700/21152; F25B 2400/075;
(Continued)

(56) References Cited

U.S. PATENT DOCUMENTS

| | | |
|---|---|---|
| 4,105,374 A | 8/1978 | Scharf |
| 5,550,736 A | 8/1996 | Hay et al. |

(Continued)

FOREIGN PATENT DOCUMENTS

| | | |
|---|---|---|
| DE | 28 10 059 A1 | 10/1978 |
| DE | 102 97 008 T5 | 9/2004 |

(Continued)

*Primary Examiner* — Michael J Brown
(74) *Attorney, Agent, or Firm* — Reinhart Boerner Van Deuren P.C.

(57) ABSTRACT

In order to improve the operational reliability of a refrigerant compressor system that includes a first refrigerant line that conducts expanded refrigerant, a second refrigerant line that conducts compressed refrigerant, at least one refrigerant compressor that is arranged between the first and the second refrigerant line and is driven by a motor, and a control unit for operating the refrigerant compressor system, it is proposed that the control unit should have a first central processing unit and at least one input/output unit for control variables that communicates with the first central processing unit, and that there should be associated with the first central processing unit a second central processing unit which, in the event of a failure of the first central processing unit, takes over the control functions for the purpose of controlling the refrigerant compressor system.

26 Claims, 3 Drawing Sheets

(51) Int. Cl.
*F04B 27/24* (2006.01)
*F04B 49/06* (2006.01)
*F04B 39/12* (2006.01)
*F25B 9/06* (2006.01)
*F25B 31/00* (2006.01)

(52) U.S. Cl.
CPC ............ *F04B 49/065* (2013.01); *G05B 15/02* (2013.01); *F25B 31/004* (2013.01); *F25B 2400/075* (2013.01); *F25B 2400/23* (2013.01); *F25B 2700/1931* (2013.01); *F25B 2700/1933* (2013.01); *F25B 2700/21151* (2013.01); *F25B 2700/21152* (2013.01)

(58) Field of Classification Search
CPC .. F25B 49/022; F25B 31/004; F25B 2400/23; F25B 2700/1931; F25B 2700/1933; F04B 49/065; F04B 27/24; F04B 39/121; G05B 23/0286; G05B 15/02
USPC ................................................ 700/275, 276
See application file for complete search history.

(56) References Cited

U.S. PATENT DOCUMENTS

| | | | | |
|---|---|---|---|---|
| 6,332,327 | B1* | 12/2001 | Street | F25B 49/02 236/51 |
| 6,421,593 | B1* | 7/2002 | Kempen | B60R 16/0315 180/271 |
| 8,738,184 | B2* | 5/2014 | Kao | G05B 15/02 361/42 |
| 9,003,208 | B2* | 4/2015 | Parks | G06F 1/3203 713/300 |
| 2003/0093570 | A1 | 5/2003 | Bissett | |
| 2004/0247452 | A1 | 12/2004 | Sato | |
| 2004/0258533 | A1 | 12/2004 | Sato | |
| 2005/0012638 | A1* | 1/2005 | Barbir | G08C 19/00 340/870.01 |
| 2011/0005266 | A1 | 1/2011 | Martin | |
| 2012/0188869 | A1 | 7/2012 | Lee et al. | |

FOREIGN PATENT DOCUMENTS

| | | |
|---|---|---|
| DE | 60 2004 000 156 T2 | 6/2006 |
| DE | 60 2004 002 317 T2 | 4/2007 |
| DE | 10 2008 004 569 A1 | 7/2009 |
| DE | 10 2012 000 158 A1 | 7/2012 |

* cited by examiner

REFRIGERANT COMPRESSOR SYSTEM

CROSS-REFERENCE TO RELATED PATENT APPLICATION

This application is a continuation of International application number PCT/EP2016/054907 filed on Mar. 8, 2016.

This patent application claims the benefit of International application No. PCT/EP2016/054907 of Mar. 8, 2016 and German application No. 10 2015 103 730.0 of Mar. 13, 2015, the teachings and disclosure of which are hereby incorporated in their entirety by reference thereto.

BACKGROUND OF THE INVENTION

The invention relates to a refrigerant compressor system, in particular for ammonia as the refrigerant, including a first refrigerant line that conducts expanded refrigerant, a second refrigerant line that conducts compressed refrigerant, at least one refrigerant compressor that is arranged between the first and the second refrigerant line and is driven by a motor, and a control unit for operating the refrigerant compressor system.

Refrigerant compressor systems of this kind are known from the prior art.

These have the problem that they are usually used in an environment in which a failure of the refrigerant compressor system can entail considerable financial damages.

For example, refrigerant compressor systems of this kind are used in large chilling systems, and a failure of a refrigerant compressor system can result in considerable damage to the chilled goods that are to be chilled in the chilling systems.

It is therefore the object of the invention to improve the operational reliability of a refrigerant compressor system of this kind.

This object is achieved according to the invention in the case of a refrigerant compressor system of the type mentioned in the introduction in that the control unit has a first central processing unit and at least one input/output unit for control variables that communicates with the first central processing unit, and in that there is associated with the first central processing unit a second central processing unit which, in the event of a failure of the first central processing unit, takes over the control functions of the refrigerant compressor system from the first central processing unit, for the purpose of control.

SUMMARY OF THE INVENTION

The advantage of the solution according to the invention lies in the fact that it enables the safeguarding against failure of a refrigerant compressor system of this kind to be improved considerably, since a fault in the first central processing unit does not result in total failure of the refrigerant compressor system. Because the second central processing unit takes over control and continues operation of the refrigerant compressor system, by contrast the fault in the first central processing unit can be eliminated without problems and without time pressure.

As regards the communication of the at least one input/output unit, an advantageous solution provides for the first central processing unit to communicate with at least one input/output unit by way of a bus system.

Further, as an alternative or in addition, the first central processing unit moreover takes a form such that it communicates directly with at least one input/output unit.

In the case of the second central processing unit as well, it is advantageous if it communicates with at least one input/output unit by way of a bus system.

Further, as an alternative or in addition, it is advantageous if the second central processing unit communicates directly with at least one input/output unit.

Further, as regards the communication between the second central processing unit and the first central processing unit, it is advantageous if the second central processing unit communicates with the first central processing unit by way of a bus system.

In order advantageously to simplify the communication, in particular in the event of the control functions being taken over by the second central processing unit, it is preferably provided for the second central processing unit to communicate with the first central processing unit by way of the same bus system as at least some of the input/output units.

It is even more advantageous if the second central processing unit communicates with the input/output units by way of the same bus system as the first central processing unit.

In order to avoid problems in communication by way of the bus system, it is preferably provided for the second central processing unit not to communicate actively with the input/output units during operation of the refrigerant compressor system by the first central processing unit.

Further, and on the other hand, it is advantageous if the first central processing unit does not communicate actively with the input/output units during operation of the refrigerant compressor system by the second central processing unit.

Detailed statements have not yet been made as regards the construction of the central processing units.

Thus, an advantageous solution provides for the first central processing unit to have a first processor and a first memory, and for the second central processor unit to have a second processor and a second memory.

Further, it is preferably provided for the same operating data to be stored in the second memory as in the first memory, which is associated with the first processor.

In particular, it is provided for the first central processing unit to transmit the operating data to be stored in the first memory, constantly and promptly with storage in the first memory, to the second central processing unit in the form of a data stream, in order in this way to make the data in the second memory of the second central processing unit available promptly and hence to be able to take over operation of the refrigerant compressor system by the second central processing unit at any time.

In particular, it is provided for the first central processing unit to transmit the data stream within a predetermined tolerance time interval, in particular beginning with storage in the first memory, wherein the tolerance time interval establishes how quickly the data that are stored in the first memory are also available in the second memory, so that thereafter it is possible for operation to be taken over by the second central processing unit.

So that it is constantly possible to identify whether the first central processing unit is operating reliably, it is provided for the second central processing unit constantly to monitor proper functioning of the first central processing unit, and in particular to take over control of the refrigerant compressor system automatically in the event that proper functioning no longer prevails.

In this context, constant monitoring of the first central processing unit of this kind may be performed in the most diverse ways.

Thus, a first advantageous solution provides for the second central processing unit to monitor whether the first central processing unit is operational by monitoring a data stream transmitted from the first central processing unit.

This means that the second central processing unit constantly monitors the data stream coming from the first central processing unit and uses the data stream to analyse the proper functioning of the first central processing unit.

For example, it would be conceivable to analyse the proper functioning of the first central processing unit using the data structure of the data stream.

However, a particularly simple possibility provides for the second central processing unit to monitor the time intervals between data packets transmitted from the first central processing unit to the second central processing unit.

These data packets could on the one hand be data packets of the data stream for updating the second memory.

However, it would also be conceivable only to provide as data packets notification signals or other data that are transmitted from the first central processing unit to the second central processing unit in order to notify the second central processing unit that the first central processing unit is constantly functioning properly.

For example, the simplest possibility using data packets provides, in the event of a data packet not being succeeded by a data packet for more than a second, for the second central processing unit to act on the basis that the first central processing unit is no longer functioning properly, and to take over control of the refrigerant compressor system automatically.

More detailed statements have not yet been made as regards the procedure when the control functions are taken over from the first central processing unit by the second central processing unit.

Thus, an advantageous solution provides for the second central processing unit to deactivate the first central processing unit when the control function of the first central processing unit is taken over.

In order, in this case, to be sure that no addressing collisions occur when the refrigerant compressor system is operated by the second central processing unit, it is preferably provided, after the second central processing unit has taken over the control functions from the first refrigerant compressor system, for it to keep the first central processing unit deactivated until the control unit of the refrigerant compressor system is reset by a servicing intervention acting on the first central processing unit and the second central processing unit.

In the context of the explanation given above of the solution according to the invention, the focus has only been on the solutions resulting from the first central processing unit and the second central processing unit.

Thus, a further improvement to the operational reliability is possible if a plurality of input/output units are associated with the bus system that communicates with the at least one central processing unit and hence communicate with the central processing unit that respectively controls the refrigerant compressor system.

Furthermore, the operational reliability of the refrigerant compressor system can be improved if sensors associated with the refrigerant compressor system are associated with a plurality of input/output units that are associated with the bus system.

The refrigerant compressor system is hence able to detect sensor values reliably, by way of the sensors that are coupled to the input/output units, wherein it is preferably provided for the plurality of sensors to be associated with a plurality of different input/output units in order to lose as little information as possible even in the event that input/output units fail.

As an alternative or in addition, an advantageous solution provides for sensors to be connected to a plurality of input/output units at the same time, in order in this way to be able, for example in the event that one of the input/output units fails, still to detect the sensor values using the other input/output units.

A further advantageous solution provides for redundant sensors to be associated with the sensors that are primarily provided for operation, and for the redundant sensors to be connected to different input/output units of the control unit from those sensors primarily provided for operation.

A further advantageous solution provides for example for some of the sensors, for example the redundant sensors, to be connected up to the input/output units that communicate directly with the central processing units, in order in this way, even in the event of failure of the bus system, to have the possibility of continuing to operate the refrigerant compressor system using the for example redundant sensors.

Further, it is preferably provided for some of the sensors to be connected to a plurality of input/output units at the same time.

This is particularly advantageous if the for example redundant sensors are connected to the input/output units that communicate directly with the central processing units, since in this case it is possible to change from one central processing unit to the other central processing unit and for the sensors still to be able to be interrogated by way of the input/output unit that communicates directly with the respective processing unit.

In order also to be able to control the individual components of the refrigerant compressor system, it is preferably provided for the input/output units to be connected to actuator or display units.

The term "actuator" should be understood to mean any components of the refrigerant compressor system that serve as drives or servo elements.

For example, the input/output units could be connected to motor controllers and/or to an inverter for the motor of the respective refrigerant compressor as actuators.

A further advantageous embodiment of the refrigerant compressor system according to the invention provides for at least two parallel refrigerant compressors to be provided between the first refrigerant line and the second refrigerant line.

Two refrigerant compressors of this kind provide the possibility of likewise improving the operational reliability of the refrigerant compressor system, since in the event that one of the refrigerant compressors fails, the second refrigerant compressor is still available and functioning properly.

It is even more advantageous if the control unit monitors the refrigerant compressors and, in the event of failure of one of the refrigerant compressors, activates one of the refrigerant compressors that is not currently active.

This solution is particularly advantageous because, in the plurality of operating states apart from extreme operating states, not all the refrigerant compressors of the refrigerant compressor system are working and so there is always at least one of the refrigerant compressors that is not active.

In the event of failure of one of the refrigerant compressors, it is thus possible to activate a refrigerant compressor that is not currently active, by means of the control unit.

In particular, in the case of a refrigerant compressor system of this kind having a plurality of parallel refrigerant compressors, it is provided for no more than four refrigerant compressors to be used in a refrigerant compressor module in order to reduce the costs of connecting up the plurality of refrigerant compressors. However, it is provided for a plurality of refrigerant compressor modules to be used in a refrigerant compressor system according to the invention.

In this case, even in the event of failure of a refrigerant compressor, three quarters of the maximum output of the refrigerant compressor module or the refrigerant compressor system is thus still available.

It has proved particularly favourable if no more than three refrigerant compressors operate in the refrigerant compressor module or refrigerant compressor system, such that, even in the event of failure of one of the refrigerant compressors, two thirds of the maximum output is still available.

Further features and advantages of the invention form the subject matter of the description below and the illustrative drawing of an exemplary embodiment of a refrigerant compressor system according to the invention.

DETAILED DESCRIPTION OF THE INVENTION

Figure 1:
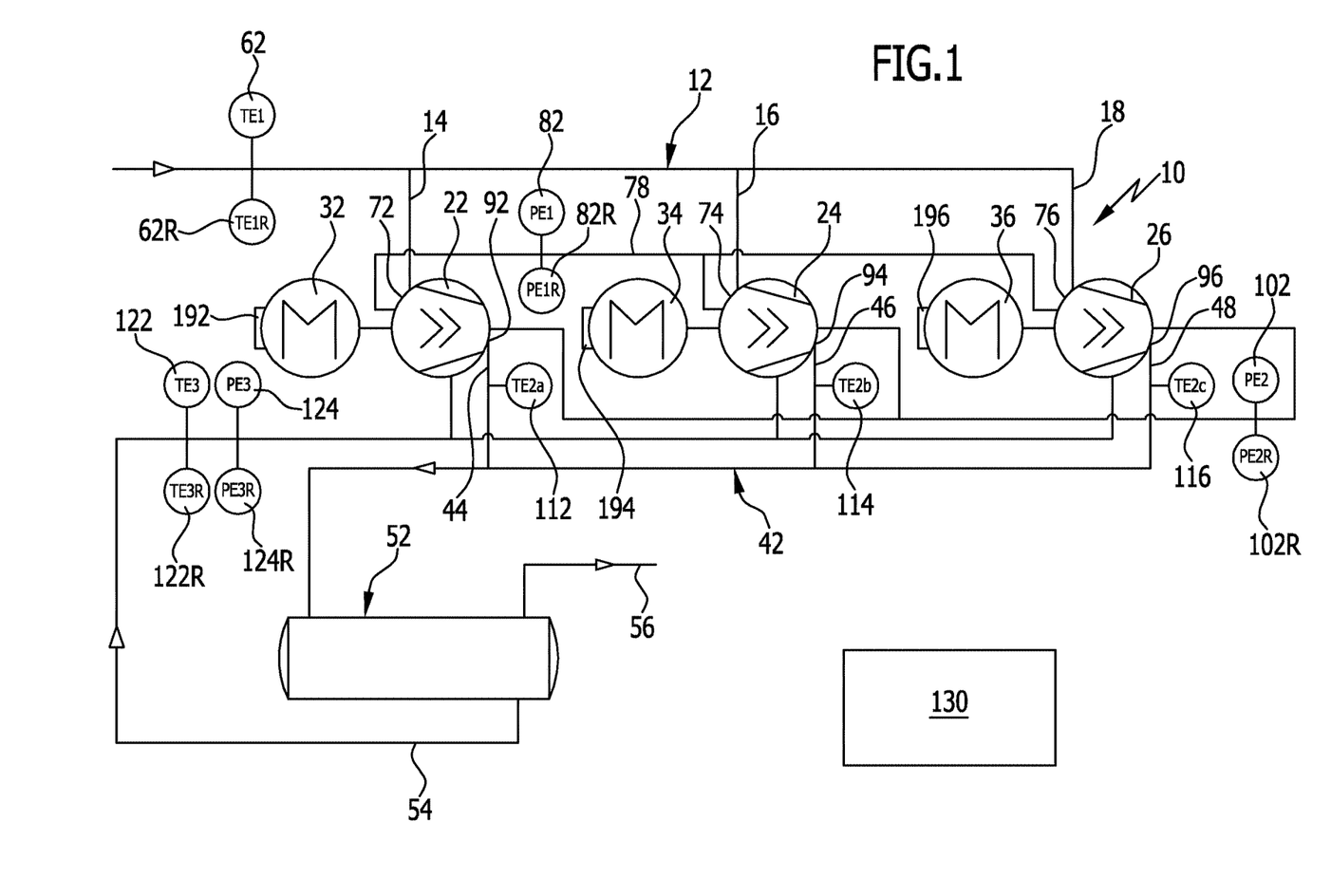
FIG. 1 shows an overview diagram of a refrigerant compressor system according to the invention.

A refrigerant compressor system which is schematically illustrated in FIG. 1, being designated 10 as a whole, is arranged in a refrigerant circuit and includes a first refrigerant line 12 that conducts expanded refrigerant, which is supplied for example from an expansion device to a heat exchanger associated therewith, neither of which is illustrated in FIG. 1.

In the case of the illustrated refrigerant compressor system 10, the first refrigerant line 12 includes three supply lines 14, 16, 18, each of which leads to a refrigerant compressor 22, 24, 26 that is respectively driven by a separate motor 32, 34, 36, preferably an electric motor, and compresses the refrigerant which is moved through the refrigerant line 12 to a higher pressure than in the first refrigerant line 12, wherein this higher pressure is typically an intermediate pressure or a high pressure.

The compressed refrigerant is conducted away out of the respective refrigerant compressor 22, 24, 26 through a second refrigerant line 42 that includes branch lines 44, 46, 48 that lead to each of the refrigerant compressors 22, 24, 26.

The second refrigerant line 42 conducts the compressed refrigerant to a lubricant separator, which is designated 52 as a whole and by means of which the lubricant that is entrained by the compressed refrigerant out of the refrigerant compressors 22, 24, 26 is separated off and accumulates in the lubricant separator 52, for example at the base, and is moved back to the individual refrigerant compressors 22, 24, 26 for the purpose of lubrication by way of a lubricant supply line 54 leading out of the lubricant separator 52.

The second refrigerant line 42 further leads the refrigerant that is conducted through the lubricant separator 52 to a further element in the refrigerant circuit, for example in the form of a heat transfer supply line 56, to a heat transfer device on the pressure side, for the purpose of cooling the refrigerant that is heated by compression in the refrigerant compressors 22, 24, 26.

For the purpose of monitoring the refrigerant compressor system 10, a multiplicity of sensors are associated therewith.

For example, a temperature of the expanded refrigerant entering the first refrigerant line 12 is detected by means of a first temperature sensor 62, which detects the temperature of the entire stream of expanded refrigerant that is conducted in the first refrigerant line 12.

At the same time, a redundant temperature sensor 62R is associated with the temperature sensor 62, for reasons mentioned in detail below.

Suction lines 72, 74, 76 of the refrigerant compressors 22, 24, 26, connected to the branch lines 14 of the first refrigerant line 12, likewise have their suction pressure monitored.

In this regard, a suction pressure sensor could be associated with each suction side 72, 74, 76.

In the exemplary embodiment illustrated, all the suction sides 72, 74, 76 are connected to a pressure-detecting line 78 in which there is arranged a suction pressure sensor 82, with which there is likewise associated a redundant suction pressure sensor 82R in the pressure-detecting line 78.

In the case of the refrigerant compressors 22, 24, 26 that are provided in the refrigerant compressor system 10 according to the invention, the pressure sides 92, 94, 96 thereof that are connected to the branch lines 44, 46, 48 of the second refrigerant line 42 likewise have the pressure of the compressed refrigerant monitored.

For this purpose too, a separate compression pressure sensor could be associated with each of the pressure sides 92, 94, 96.

In the case of the solution illustrated, which is the simplest possible construction, a pressure-detecting line 98 that connects the pressure sides 92, 94, 96 is likewise provided, and a final pressure sensor 102 and a redundant final pressure sensor 102 R associated therewith are arranged therein.

Further, also associated with each of the branch lines 44, 46, 48 is a second temperature sensor 112, 114, 116 that detects the temperature, in the branch lines 44, 46, 48 of the second refrigerant line 42, of the refrigerant that is compressed by the respective refrigerant compressors 22, 24, 26.

No redundant second temperature sensors are associated with these second temperature sensors 112, 114, 116, since a separate second temperature sensor 112, 114, 116 is associated with each of the refrigerant compressors 22, 24, 26 as a result of being provided in the respective branch line 44, 46, 48, with the result that a faulty display or a failure of one of these temperature sensors 112, 114, 116 can be identified from the temperature measurements of the respectively other second temperature sensors 112, 114, 116, and moreover can also be checked by a cross-check of the pressure in the pressure-detecting line, measured by the final pressure sensor 102.

To detect the temperature and pressure of the lubricant that is fed back from the lubricant separator 52 to the individual refrigerant compressors 22, 24, 26 by way of the lubricant supply line 54, there is associated with the lubricant supply line 54 a lubricant temperature sensor 122 with which, for its part, there is associated a redundant lubricant temperature sensor 122 R.

Further, there is associated with the lubricant supply line 54 a lubricant pressure sensor 124 and a redundant lubricant pressure sensor 124 R, with the result that the pressure and temperature in the lubricant supply line 54 can likewise be constantly detected.

Figure 2:
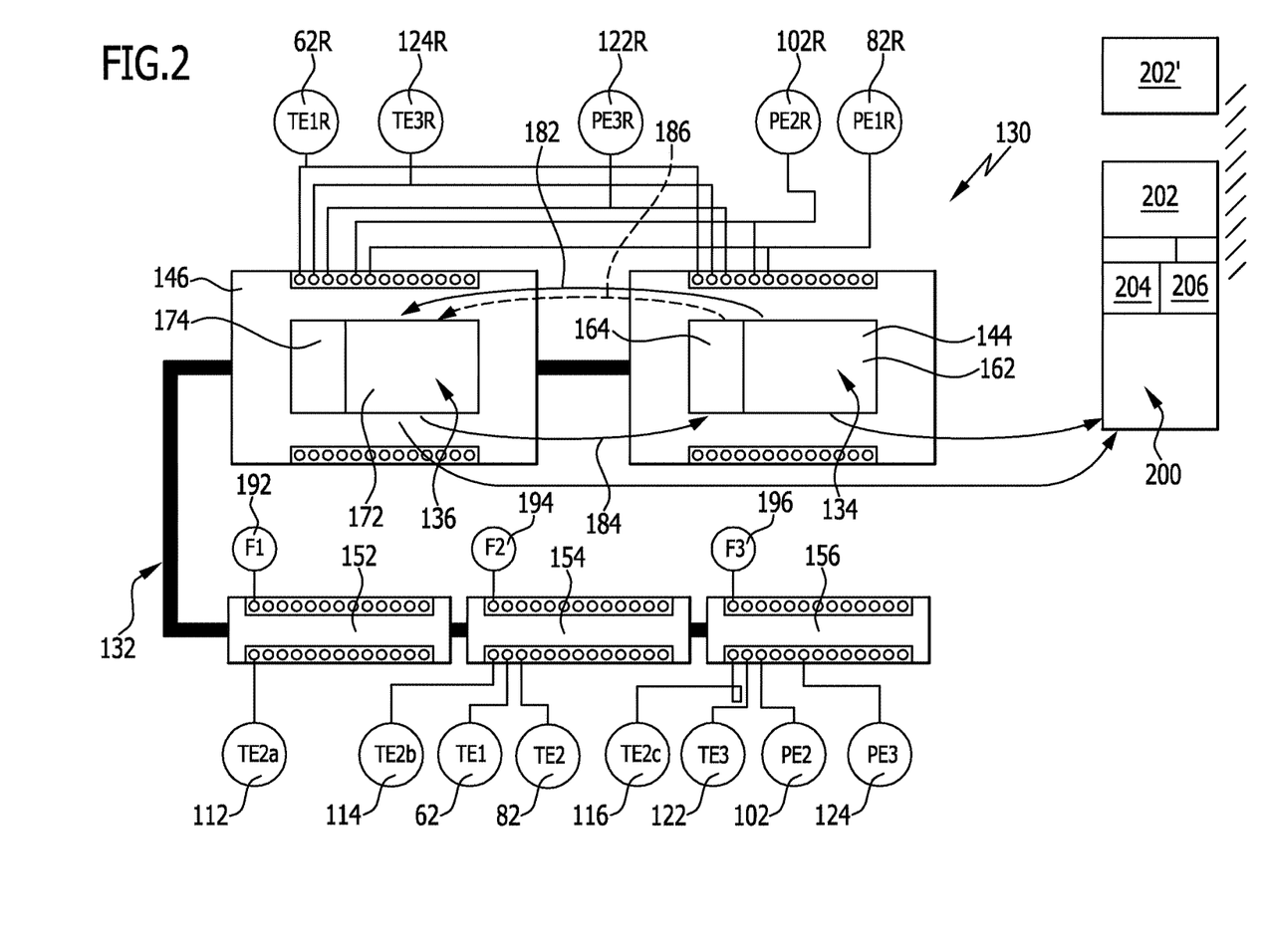
FIG. 2 shows a schematic structure of a control unit of the refrigerating unit according to the invention.

The individual operating states of the refrigerant compressor system 10 are controlled by a control unit that is designated 130 as a whole and is illustrated in detail in FIG. 2, for example on the basis of sensor values of one or more of the sensors that are explained above, or on the basis of external control variables that are determined for example from sensor values, measured in further elements of the refrigerant circuit.

The control unit 130 according to the invention, illustrated in FIG. 2, includes a bus system 132 by way of which a first central processing unit 134 and a second central processing unit 136 are connected.

For example, but not necessarily, each of the central processing units 134 and 136 is directly connected to an input/output unit 144 and 146 respectively, and in addition the central processing units 134 and 136 are connected by way of the bus system 132 to further input/output units 152, 154, 156.

The input/output units 144 and 146 and 152, 154 and 156 serve to make connections to the individual sensors of the refrigerant compressor system 10, or indeed to emit control signals for operation of the refrigerant compressor system, for example for the motors 32, 34, 36.

For example, in the case of the control unit 130 according to the invention, it is provided for the first temperature sensor 62 and the suction pressure sensor 82 to be coupled to the input/output unit 154.

Further, for example the final pressure sensor 102 is connected to the input/output unit 156.

Further, for example the second temperature sensors 112, 114 and 116 are each connected to one of the input/output units 152, 154 and 156, with the result that with these second temperature sensors 112, 114 and 116 too, even in the event of a failure of one of the input/output units 152, 154 and 156 it is possible to continue operation, since the other input/output units 156, 154 or 152 are still functioning properly.

This means that by distributing the connection of the plurality of second temperature sensors 112, 114 and 116 among respectively different input/output units 152, 154 and 156, both a failure of one of the second temperature sensors 112, 114 and 116 and also a failure of one of the input/output units 152, 154, 156 have the same effect, and can be compensated for by detecting the temperature in the second refrigerant line 42 by means of the remaining properly functioning temperature sensors 112, 114, 116.

Moreover, the redundant sensors—that is to say for example the redundant first temperature sensor 62R, the redundant suction pressure sensor 82 R, the redundant final pressure sensor 102R—are each connected in parallel with both the input/output unit 144 of the first central processing unit 134 and with the input/output unit 146 of the second central processing unit 136.

Besides, the lubricant temperature sensor 122 and the lubricant pressure sensor 124 are for example connected to the input/output units 152, 154 and 156, while the corresponding redundant sensors—that is to say the redundant lubricant temperature sensor 122R and the redundant lubricant pressure sensor 124R—are likewise connected in parallel to the input/output units 144, 146.

So that the two central processing units 134 and 136 according to the invention can be used redundantly as simply as possible, these are preferably of identical construction.

In particular, the first central processing unit 134 includes a first processor 162 and a first memory 164, and the second central processing unit 136 includes a second processor 172 and a second memory 174.

Here, the two central processing units 134 and 136 cooperate as follows.

In a normal operating mode, the central processing unit 134 takes over all the control functions for the refrigerant compressor system 10 according to the invention, and in so doing in particular communicates with the input/output unit 144 that is directly associated therewith and with the input/output units 152, 154, 156 that are connected by way of the bus system 132.

The second central processing unit 136 operates in a standby state in which there is no communication with the input/output units, wherein there is transmitted to the second central processing unit 136 in the standby state, constantly or at successive intervals, a data stream 182 that includes all the data stored in the first memory 164 by the first processor 162.

This data stream 182 is likewise stored in the second memory 174 by the second processor 172 of the second central processing unit 136 in the standby state, with the result that the second memory 174 always has available all the data that are also stored in the first memory 164, and thus the second processor 172 is at any time able to take over control of the refrigerant compressor system 10 on the basis of the same data required for operation of the refrigerant compressor system 10.

Moreover, the second processor 172 has the same addresses as the first processor 162, but there is no addressing collision because the second processor 172 does not communicate with the input/output units 146, 152, 154 and 156, because it is in the standby state.

Further, the second central processing unit 136 monitors the first central processing unit 134 in that a constant check is made of whether the first central processing unit 134 is operating.

In the simplest case, this allows a check to be made by the second central processing unit 136 of whether a check is made of the time intervals at which the data stream 182 is sent from the first central processing unit 134 to the second central processing unit 136.

If the data stream 182 drops out, or if, after a fixed time interval, a data stream 182 is no longer sent from the first central processing unit 134 to the second central processing unit 136, then the second central processing unit 136 acts on the basis that operation of the first central processing unit 134 is faulty, and takes over its tasks, in particular control of the refrigerant compressor system 10.

Control of the refrigerant compressor system 10 is taken over in that the second central processing unit 136 transmits to the first central processing unit 134 a disconnect signal 184, wherein this disconnect signal 184 can either result in the first processor 162 being completely disconnected, or indeed in the first processor 162 switching to an inoperative operating state and in so doing not communicating with the input/output units 144, 152, 154 and 156 and moreover no longer generating the data stream 182.

On the other hand, the second processor 172 is activated and now, because the data stored in the first memory 164 are mirrored in the second memory 174, is able to take over the control functions for the refrigerant compressor system 10, on the basis of the same data as the first processor 162.

As an alternative to monitoring the data stream 182 that is transmitted from the first central processing unit 134 to the second central processing unit 136, it is also possible for the function of the first central processing unit 134 to be detected in that the first central processing unit 134 generates notification signals 186 at defined time intervals and transmits them to the second central processing unit 136. In the absence of the notification signals, the second central processing unit 136 takes over the control functions of the control unit 130 and preferably continues to operate with the same addresses for the input/output units 146, 152, 154 and 156, since the second processor 172 operates with the same program as the first processor 162.

Because the second processor 172 is provided with the same addresses and operates in exactly the same way as the first processor 162, the second processor 172 is also able in the same way to take over all communication with both the input/output unit 146 and also the input/output units 152, 154 and 156 without needing to adjust the communication paths over the bus system 132.

The disconnect signal 184 that is transmitted from the second central processing unit 136 to the first central processing unit 134 can in this case either result in a complete physical disconnection of the first processor 162 or in a blocking thereof that prevents functioning.

Each of the central processing units 134 and 136 operates primarily with the sensor values of the sensors 62, 82, 112, 114, 116, 122 and 124 that are connected to the input/output unit 152, 154 and 156.

However, if a fault occurs at one of these sensors, the respective central processing unit 134 or 136 operates using the sensor values of the redundant sensors 62R, 82R, 102R, 122R and 124R that apply at the input/output unit 144 or 146 of the respective central processing unit 134 or 136 and so are available for the respective central processing unit 134 or 136.

Thus, functioning of the control unit 130 is protected against a failure of one of the sensors and a failure of the first central processing unit 134.

The operational reliability is further increased in that, as illustrated in FIG. 1, the refrigerant compressor system has at least two, preferably three refrigerant compressors 22, 24 and 26 that are connected in parallel and have the corresponding motors 32, 34, 36, wherein different motor controllers 192, 194, 196, in particular inverters, of the respective motors 32, 34, 36 are connected up to different input/output units. Because the performance of at least one of the refrigerant compressors 22, 24, 26 is dispensable during most operating periods, apart from extreme operating states, it is possible in particular to disconnect the respective motor 32, 34, 36 thereof from the control unit 130.

Thus, apart from an extreme operating state in which the performance of all three refrigerant compressors 22, 24, 26 is needed, the refrigerant compressor system 10 according to the invention is protected, likewise with redundancy, against the failure of one of the refrigerant compressors 22, 24, 26 and/or one of the respective motors 32, 34, 36 and/or one of the respective motor controllers 192, 194, 196, since in the event of a failure of one of these refrigerant compressors 22, 24, 26 or one of the corresponding motors 32, 34, 36 or one of the motor controllers 192, 194, 196, in each case the refrigerant compressor 22, 24, 26 that is not operating and the corresponding motor 32, 34, 36 can be activated by the control unit 130 and set in operation, while the faulty refrigerant compressor 22, 24, 26 and the corresponding motor 32, 34, 36 are disconnected.

For the purpose of operating the control unit 130, in particular the central processing units 134, 136, there is further associated with these central processing units 134 and 136 an operating unit 200 which, for its part, is provided with a display unit 202 communicating with the operating unit 200 over a wired connection, and has a memory 204 and a processor 206 for generating image elements on the display unit 202, wherein image elements on a user interface of the display unit 202, which represent components of the refrigerant compressor system 10 and operating elements, are generated on the display unit 202 by the processor 206 from image element data that are stored in the memory 204.

In addition to the display unit 202 with a wired connection, there is provided a display unit 202' that communicates wirelessly with the operating unit 200, for example communicating with the operating unit 200 by way of W-LAN, Bluetooth or another communication network, and which in one embodiment may be a suitable mobile telephone or a tablet computer.

Thus, a display unit 202' is portable and may be used by an operating person at any time for the purpose of monitoring and/or functional control of the refrigerant compressor system 10.

Figure 3:
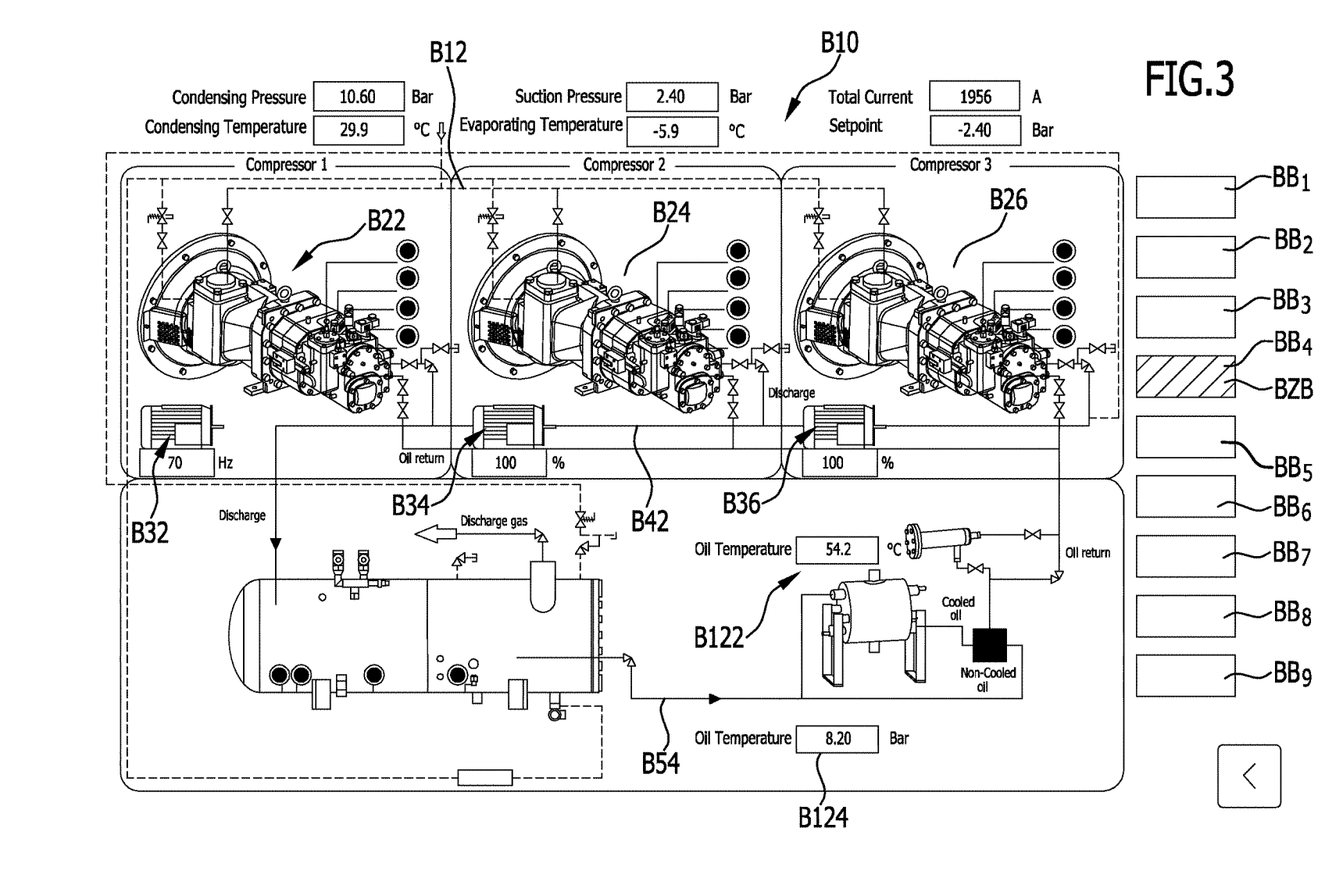
FIG. 3 shows an exemplary illustration of a user interface of a control unit of the refrigerant compressor system.

In this way, for example as a first user interface, the operating unit 200 generates the overview representation that is illustrated in FIG. 3, which represents a refrigerant compressor module 10 having two to three refrigerant compressors 22, 24, 26, as an image that is composed for example of compressor image elements B22, B24, B26 and line image elements B12, B42, B54 and actuator image elements B32, B34, B36.

Further, the representation according to FIG. 3 also has operating image elements BB that represent operating elements by means of which individual functions of the control unit 130 are activatable or deactivatable.

Preferably, it is possible to represent on the display unit 202, in addition to the operating image element BB, an operating state image element BZB, which represents the operating state, for example by a difference between light and dark, or a difference in colour.

Further, the overview representation according to FIG. 3 also includes sensor image elements B122 and B124 that display the sensor data.

Preferably, both display units 202 and 202' are provided with touch-sensitive surfaces 208, 208' and are thus operable as touch screens.

The invention claimed is:

1. A refrigerant compressor system, including:
a first refrigerant line that conducts expanded refrigerant,
a second refrigerant line that conducts compressed refrigerant,
at least one refrigerant compressor that is arranged between the first and the second refrigerant line and is driven by a motor,
and a control unit for operating the refrigerant compressor system, the control unit having a first central processing unit,
a plurality of input/output units are associated with a bus system that communicates with the first central processing unit that respectively controls the refrigerant compressor system,
wherein sensors, associated with the refrigerant compressor system, are associated with the plurality of input/output units that are associated with the bus system, and
wherein redundant sensors are associated with the sensors that are primarily provided for operation, and in that the redundant sensors are connected to different input/output units of the control unit from those sensors primarily provided for operation.

2. The refrigerant compressor system according to claim 1, wherein there is associated with the first central processing unit a second central processing unit which, in the event of a failure of the first central processing unit, takes over the control functions for the purpose of controlling the refrigerant compressor system.

3. A refrigerant compressor system according to claim 2, wherein the first central processing unit communicates with at least one input/output unit by way of a bus system.

4. A refrigerant compressor system according to claim 2, wherein the first central processing unit communicates directly with at least one input/output unit.

5. A refrigerant compressor system according to claim 2, wherein the second central processing unit communicates with at least one input/output unit by way of a bus system.

6. A refrigerant compressor system according to claim 2, wherein the second central processing unit communicates directly with at least one input/output unit.

7. A refrigerant compressor system according to claim 2, wherein the second central processing unit communicates with the first central processing unit by way of a bus system.

8. A refrigerant compressor system according to claim 7, wherein the second central processing unit communicates with the first central processing unit by way of the same bus system as at least some of the input/output units.

9. A refrigerant compressor system according to claim 2, wherein the second central processing unit communicates with the input/output units by way of the same bus system as the first central processing unit.

10. A refrigerant compressor system according to claim 2, wherein the second central processing unit does not communicate actively with the input/output units during operation of the refrigerant compressor system by the first central processing unit.

11. A refrigerant compressor system according to claim 2, wherein the first central processing unit does not communicate actively with the input/output units during operation of the refrigerant compressor system by the second central processing unit.

12. A refrigerant compressor system according to claim 2, wherein the first central processing unit has a first processor and a first memory, and in that the second central processing unit has a second processor and a second memory.

13. A refrigerant compressor system according to claim 12, wherein the same operating data are stored in the second memory as in the first memory, which is associated with the first processor.

14. A refrigerant compressor system according to claim 12, wherein the first central processing unit transmits the operating data to be stored in the first memory, constantly and promptly with storage in the first memory, to the second central processing unit in the form of a data stream.

15. A refrigerant compressor system according to claim 12, wherein the first central processing unit transmits the data stream within a predetermined tolerance time interval.

16. A refrigerant compressor system according to claim 2, wherein the second central processing unit constantly monitors proper functioning of the first central processing unit, and in particular takes over control of the refrigerant compressor system automatically in the event that proper functioning no longer prevails.

17. A refrigerant compressor system according to claim 16, wherein the second central processing unit monitors whether the first central processing unit is operational by monitoring a data stream transmitted from the first central processing unit.

18. A refrigerant compressor system according to claim 16, wherein the second central processing unit monitors the time intervals between data packets transmitted from the first central processing unit to the second central processing unit.

19. A refrigerant compressor system according to claim 2, wherein in the event of a data packet not being succeeded by a data packet for more than a second, the second central processing unit acts on the basis that the first central processing unit is no longer functioning properly, and takes over control of the refrigerant compressor system automatically.

20. A refrigerant compressor system according to claim 2, wherein the second central processing unit deactivates the first central processing unit when the control functions of the first central processing unit are taken over.

21. A refrigerant compressor system according to claim 2, wherein after the second central processing unit has taken over the control function from the first refrigerant compressor system, it keeps the first central processing unit deactivated until the control unit of the refrigerant compressor system is reset by a servicing intervention acting on the first central processing unit and the second central processing unit.

22. A refrigerant compressor system according to claim 1, wherein some of the sensors are connected up to the input/output units that communicate directly with the first central processing units.

23. A refrigerant compressor system according to claim 1, wherein some of the sensors are connected to a plurality of input/output units at the same time.

24. A refrigerant compressor system according to claim 1, wherein the input/output units are connected to actuator or display units.

25. A refrigerant compressor system according to claim 24, wherein the control unit monitors the refrigerant compressors and, in the event of failure of one of the refrigerant compressors, activates one of the refrigerant compressors that is not currently active.

26. A refrigerant compressor system according to claim 1, wherein at least two parallel refrigerant compressors are provided between the first refrigerant line and the second refrigerant line.

* * * * *